(12) United States Patent
Gervasi et al.

(10) Patent No.: US 6,515,069 B1
(45) Date of Patent: Feb. 4, 2003

(54) POLYDIMETHYLSILOXANE AND FLUOROSURFACTANT FUSING RELEASE AGENT

(75) Inventors: David J. Gervasi, West Henrietta, NY (US); Samuel Kaplan, Walworth, NY (US); George A. Riehle, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/942,300

(22) Filed: Aug. 30, 2001

(51) Int. Cl.⁷ .............................................. C08L 83/00
(52) U.S. Cl. ................ 524/588; 524/263; 524/319; 524/316; 524/380; 399/324; 106/2; 106/287.14
(58) Field of Search ................ 524/588, 263, 524/380, 319, 316; 399/324; 106/287.14, 2

(56) References Cited

U.S. PATENT DOCUMENTS

| | | | | |
|---|---|---|---|---|
| 3,935,147 A | * | 1/1976 | Godshalk et al. | 260/29.4 R |
| 4,075,362 A | * | 2/1978 | Concannon | 427/22 |
| 4,235,743 A | * | 11/1980 | Canevari | 252/382 |
| 4,269,739 A | * | 5/1981 | Grejsner | 252/547 |
| 4,511,489 A | * | 4/1985 | Requejo et al. | 252/172 |
| 5,369,080 A | * | 11/1994 | Lawrence et al. | 503/227 |
| 5,397,384 A | | 3/1995 | Wisniewski | 106/8 |
| 5,735,945 A | * | 4/1998 | Chen et al. | 106/287.14 |
| 5,759,980 A | * | 6/1998 | Russo et al. | 510/241 |

OTHER PUBLICATIONS

Caiguo Gong, Juan Miravet and Jean M. J. Fréchet, "Intramolecular Cyclization in the Polymerization of $AB_x$ Monomers: Approaches to the Control of Molecular Weight and Polydispersity in Hyperbranched Poly(siloxysilane)", Journal of Polymer Science: Part A: Polymer Chemistry, vol. 37, 3193–3201 (1999).

* cited by examiner

Primary Examiner—Margaret G. Moore
(74) Attorney, Agent, or Firm—Annette L. Bade

(57) ABSTRACT

A release agent having a polydimethylsiloxane and a fluorosurfactant other than a silicone glycol polymer, a perfluoroalkylsubstituted polyethylene glycol, or a perfluoroalkyl-substituted silane.

17 Claims, 3 Drawing Sheets

POLYDIMETHYLSILOXANE AND FLUOROSURFACTANT FUSING RELEASE AGENT

BACKGROUND OF THE INVENTION

The present invention relates to fuser release agents or fusing oils useful in fusing subsystems in electrostatographic, including digital and color, apparatuses. In embodiments, the release agents comprise a fluorosurfactant, which is useful in compatibilizing the dissimilar materials in a release agent, and for reducing surface tension between the liquid release agent and the solid surface of the fuser member. In embodiments, the fluorosurfactant comprises pendant acid or ester groups. In other embodiments, the fluorosurfactant contains pendant olefin groups. In still yet another embodiment, the fluorosurfactants contain pendant silane groups. In other embodiments, the fluorosurfactants contain pendant alcohol groups. In embodiments, the release agent comprises a silicone oil, and in specific embodiments, a polydimethylsiloxane oil. In embodiments, the silicone release agent may or may not contain functional groups.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes it to be firmly bonded to the support.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members.

It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The hot offset temperature or degradation of the hot offset temperature is a measure of the release property of the fuser, and accordingly it is desired to provide a fusing surface, which has a low surface energy to provide the necessary release.

To ensure and maintain good release properties of the fuser, it has become customary to apply release agents to the fuser roll during the fusing operation. Typically, these materials are applied as thin films of, for example, silicone oils such as polydialkyl siloxane, and more specifically, polydimethyl siloxane (PDMS). The fuser oils may contain functional groups or may be non-functional, or may be blends of functional and nonfunctional. Functional groups may include amino, mercapto, hydride, or other functional groups.

It is desired to have a release agent that is chemically compatible with the outer layer of the fuser member. In embodiments wherein fillers are used in the outer layer of a fuser member, it is desired to use a release agent having functional groups to react with the outer layer or fillers in the outer layer of the fuser member. The reaction between the functional groups of the release agent and the outer layer of the fuser member binds the release agent to the outer layer, thereby enabling full coverage of the fuser member surface and providing an effective barrier layer that allows for toner and paper release. In this way, a longer fuser release life is achieved.

However, problems result with certain outer layers of the fuser member are used, or when certain types of toner, ink or other print formulations are used in an electrostatographic apparatus. In addition, with known release agents, problems result in that POST-IT® notes, adhesives, laminates and the like, do not adhere sufficiently to the paper once the release agent has come into contact with the paper. This is especially true for amino-functional polydimethyl siloxane release agents, in which the release agent bonds to the cellulose of paper, and remains coated to the paper following fusing.

The use of a fluorosurfactant can help control these problems by increasing the compatibility between dissimilar components in the outer layer and the toner, ink or other print formulations. In this manner, less expensive outer layer materials may be coated on the fuser member. Similarly, off the shelf release agents may be used and specific release agents may not have to be formulated for specific outer fuser member layers. These both result in a significant cost savings. Moreover, fluorosurfactants aid in preventing release agents to remain on the surface of the print media (for example, paper), thereby improving copy or print quality. Therefore, in embodiments, the pendant release agents reduce or eliminate oil-on-copy surface, and thus contribute to improved copy quality. In addition, the use of fluorosurfactants improves wettability, thereby increasing copy or print quality.

U.S. Pat. No. 5,735,945 discloses use of a polydialkoxysilane oil and nonionic surfactants such as fluorosurfactants as a release agent for fuser members.

SUMMARY OF THE INVENTION

Embodiments of the present invention include: a release agent comprising a polydimethylsiloxane and a fluorosurfactant, wherein the fluorosurfactant is other than a silicone glycol polymer, a perfluoroalkylsubstituted polyethylene glycol, or a perfluoroalkylsubstituted silane.

Embodiments also include: a release agent comprising a polydimethylsiloxane and a fluorosurfactant having pendant groups selected from the group consisting of acid groups, ester groups, olefin groups, alcohol groups, silane groups, and mixtures thereof, wherein the fluorosurfactant is other than a silicone glycol polymer, a perfluoroalkylsubstituted polyethylene glycol, or a perfluoroalkylsubstituted silane.

Embodiments further include: a composition comprising a polydialkylsiloxane and a fluorosurfactant, wherein said fluorosurfactant is other than a silicone glycol polymer, a perfluoroalkylsubstituted polyethylene glycol, or a perfluoroalkylsubstituted silane.

In addition, embodiments include: an image forming apparatus for forming images on a recording medium comprising: a charge-retentive surface to receive an electrostatic latent image thereon; a development component to apply toner to the charge-retentive surface to develop the electrostatic latent image to form a developed image on the charge retentive surface; a transfer component to transfer the developed image from the charge retentive surface to a copy substrate; a fuser member for fusing toner images to a surface of the copy substrate; and a release agent comprising a polydimethylsiloxane and a fluorosurfactant other than a silicone glycol polymer, a perfluoroalkylsubstituted polyethylene glycol, or a perfluoroalkylsubstituted silane.

BRIEF DESCRIPTION OF THE DRAWINGS

For a better understanding of the present invention, reference may be had to the accompanying figures.

DETAILED DESCRIPTION OF THE PRESENT INVENTION

Figure 1:
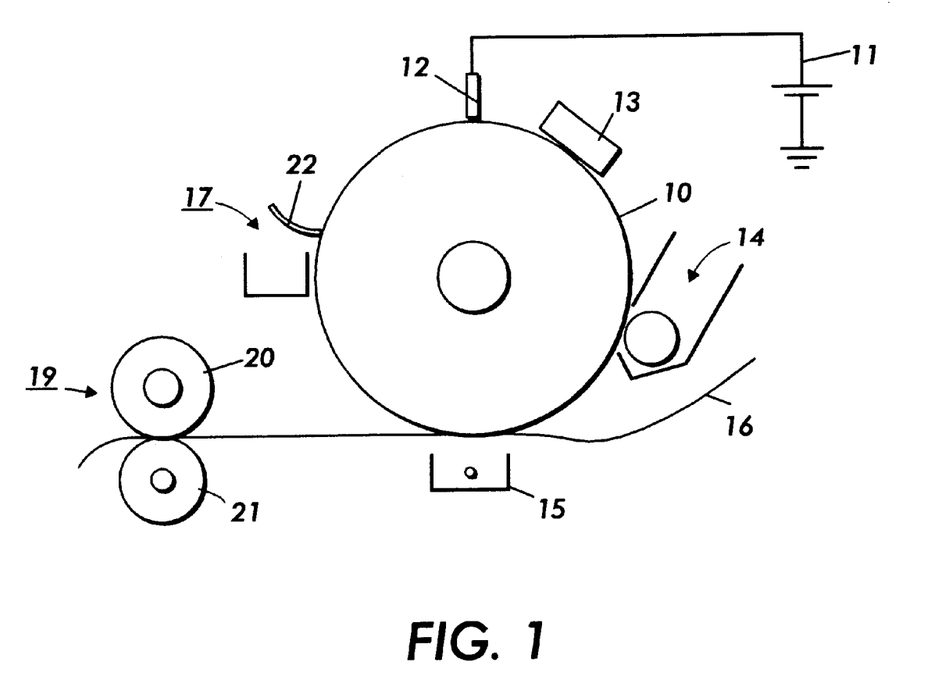
FIG. 1 is a depiction of an embodiment of an electrostatographic reproducing apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus. Although the fusing station 19 depicts the fusing and pressure members as rollers, the fuser and/or pressure member(s) may also be in the form of belts, sheets, films or other like fusing members.

Figure 2:
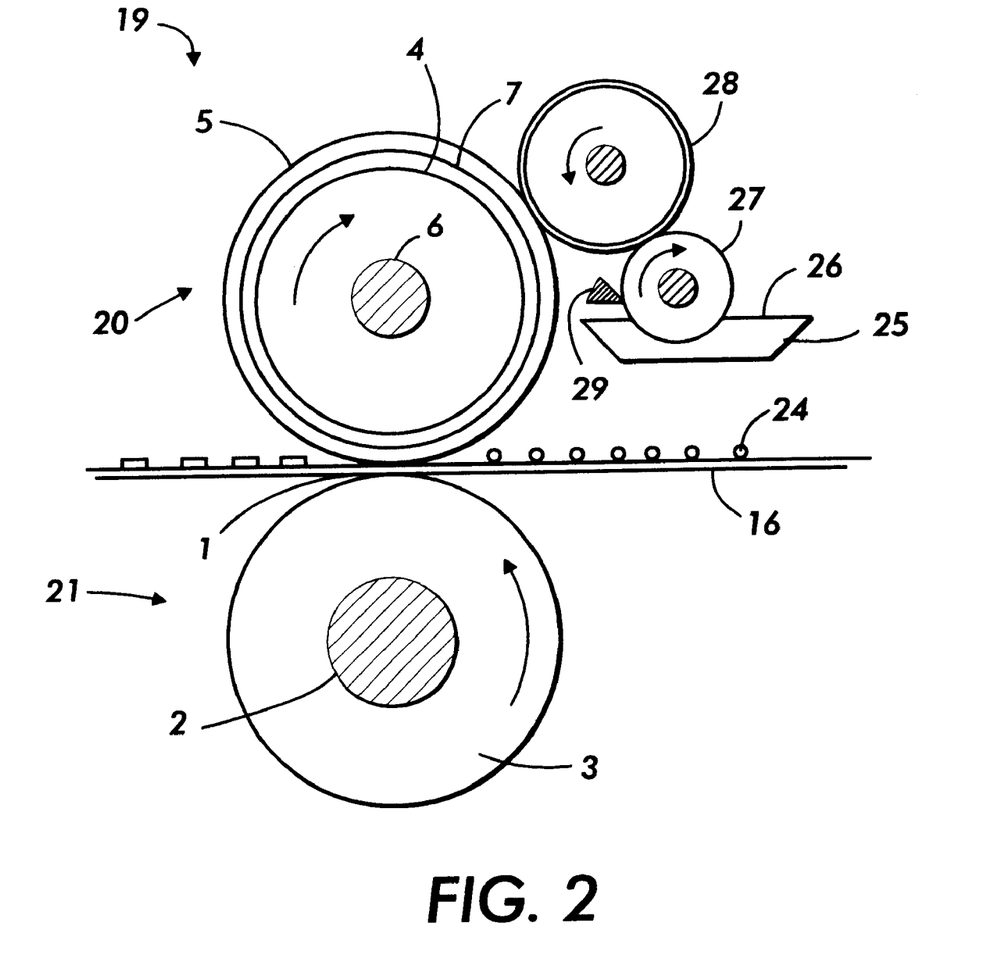
FIG. 2 is an enlarged version of an embodiment of a fusing subsystem.

Referring to FIG. 2, an embodiment of a fusing station 19 is depicted with an embodiment of a fuser roll 20 comprising polymer surface 5 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. The fuser member 20 can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26 that may be a solid or liquid at room temperature, but it is a fluid at operating temperatures. The pressure member 21 may include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicrometer thickness to thicknesses of several micrometers of release fluid. Thus, by metering device 29, preferably from about 0.1 to about 2 micrometers or greater thicknesses of release fluid can be applied to the surface of polymer or elastomer 5.

Figure 3:
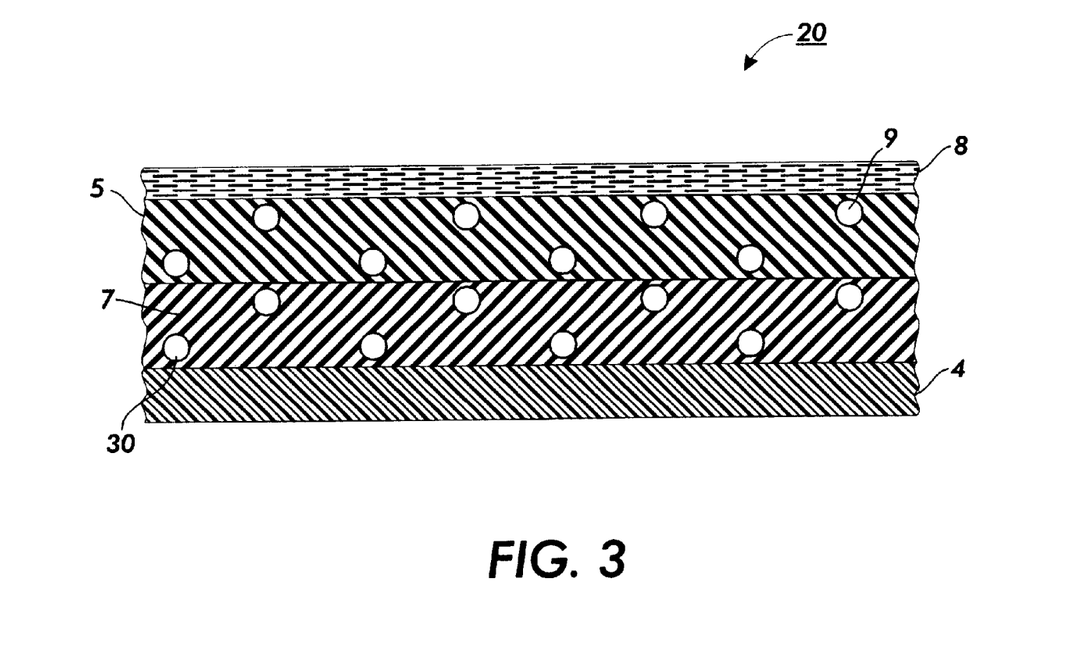
FIG. 3 is an enlarged cross-sectional view of an embodiment of a fuser member showing the layers thereon.

FIG. 3 depicts a cross-sectional view of an embodiment of the invention, wherein fuser member 20 comprises substrate 4. Also included is optional intermediate surface layer 7, which may or may not contain fillers 30 dispersed or contained therein. In addition, FIG. 3 depicts outer surface layer 5, which may or may not contain fillers 9 dispersed or contained therein. FIG. 3 also depicts fluid release agent layer 8.

Fuser member as used herein refers to fuser members including fusing rolls, belts, drelts (a hybrid of a drum and a belt), films, sheets and the like; donor members, including donor rolls, belts, drelts (a hybrid of a drum and a belt), films, sheets and the like; and pressure members, including pressure rolls, belts, drelts (a hybrid of a drum and a belt), films, sheets and the like; and other members useful in the fusing system of an electrostatographic or xerographic, including digital, machine. The fuser member of the present invention may be employed in a wide variety of machines and is not specifically limited in its application to the particular embodiment depicted herein. The present release agent can also be used in a transfer apparatus along with a transfer member.

Any suitable substrate may be selected for the fuser member. The fuser member substrate may be a roll, belt, drelt (a hybrid of a drum and a belt), flat surface, sheet, film, or other suitable shape used in the fixing of thermoplastic toner images to a suitable copy substrate. Typically, the fuser member is made of a hollow cylindrical metal core, such as copper, aluminum, stainless steel, or certain plastic materials chosen to maintain rigidity, structural integrity, as well as being capable of having a polymeric material coated thereon and adhered firmly thereto.

The fuser member may optionally comprise an intermediate layer positioned between the substrate and the outer layer. The optional intermediate layer may comprise a silicone rubber of a thickness so as to form a conformable layer. Suitable silicone rubbers include room temperature vulcanization (RTV) silicone rubbers, high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the silanes, siloxanes (for example, polydimethylsiloxanes) such as, fluorosilicones, dimethylsilicones, liquid silicone rubbers such as vinyl crosslinked heat curable rubbers or silanol room temperature crosslinked materials, and the like.

Silicone rubber materials tend to swell during the fusing process, especially in the presence of release agent. In the case of fusing color toner, normally a relatively larger amount of release agent is necessary to enhance release due to the need for a larger amount of color toner than required for black and white copies and prints. Therefore, silicone rubber is more susceptible to swell in an apparatus using color toner. A filler may be added in a relatively small amount to reduce the swell and increase the transmissibility of heat. This increase in heat transmissibility is preferred in fusing members useful in fusing color toners, due to the fact that a higher temperature (for example, from about 155 to about 180° C.) is needed to fuse color toner as compared to the temperature required for fusing black and white toner (for example, from about 50 to about 180° C.).

The filler may be contained in the optional intermediate layer in a relatively low amount. Examples of suitable fillers include carbon fillers, metal fillers, metal oxide fillers, doped metal oxide fillers, polymer fillers, and the like. Examples of metal oxides and/or metal hydroxides include tin oxide, zinc oxide, calcium hydroxide, aluminum oxide, aluminum hydroxide, magnesium oxide, lead oxide, chromium oxide, copper oxide, and the like, and mixtures thereof. Examples of carbon fillers include carbon black, graphite, fluorinated carbon, and the like, and mixtures thereof. Examples of suitable doped metal oxides include antimony doped tin oxide, antimony doped titanium dioxide, aluminum doped zinc oxide, and similar doped metal oxides and mixtures thereof. Examples of suitable polymer fillers include, polyanaline, and like polymer fillers and mixtures thereof.

In an embodiment, a metal oxide or metal oxides, such as, for example, aluminum oxide, copper oxide, or mixtures thereof, or the like, is present in an amount of from about 10 to about 50 percent, or from about 20 to about 40 percent, or from about 30 to about 35 percent by total volume of the intermediate layer.

In general, the intermediate layer has a thickness of from about 0.05 to about 15 mm, or from about 1 to about 10 mm, or from about 3 to about 7 mm. More specifically, if the intermediate silicone layer is present on a pressure member, it has a thickness of from about 0.05 to about 5 mm, or from about 0.1 to about 3 mm, or from about 0.5 to about 1 mm. When present on a fuser member, the intermediate layer has a thickness of from about 1 to about 10 mm, or from about 2 to about 5 mm, or from about 2.5 to about 3 mm. In embodiments, the thickness of the intermediate layer of the fuser member is higher than that of the pressure member so that, the fuser member is more deformable than the pressure member.

Examples of suitable outer fusing layers of the fuser member herein include polymers such as fluoropolymers. Examples of fluoropolymer coatings for the present invention include TEFLON®-like materials such as polytetrafluoroethylene (PTFE), fluorinated ethylenepropylene copolymer (FEP), perfluorovinylalkylether tetrafluoroethylene copolymer (PFA TEFLON®), polyethersulfone, copolymers and terpolymers thereof, and the like. Other examples include fluoroelastomers such as those described in detail in U.S. Pat. Nos. 5,166,031; 5,281,506; 5,366,772; 5,370,931; 4,257,699; 5,017,432; and 5,061,965, the disclosures each of which are incorporated by reference herein in their entirety. These fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E60C®, VITON E430®, VITON 910®, VITON GH® VITON GF®, VITON E45® and VITON B50®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS® a poly(propylene-tetrafluoroethylene) and FLUOREL II® (LII900) a poly(propylene-tetrafluoroethylenevinylidenefluoride) both also available from 3M Company, as well as the TECNOFLONS® identified as FOR-60KIR®, FOR-LHF®, NM® FOR-THF®, FOR-TFS®, TH®, TN505®, NH®, P959®, 819N® available from Montedison Specialty Chemical Company. In an embodiment, the fluoroelastomer is one having a relatively low quantity of vinylidenefluoride, such as in VITON GF®, available from E.I. DuPont de Nemours, Inc. The VITON GF® has 35 weight percent of vinylidenefluoride, 34 weight percent of hexafluoropropylene, and 29 weight percent of tetrafluoroethylene with 2 weight percent cure site monomer. The cure site monomer can be those available from DuPont such as 4-bromoperfluorobutene-1,1,1-dihydro-4-bromoperfluorobutene-1, 3-bromoperfluoropropene-1,1,1-dihydro-3-bromoperfluoropropene-1, or any other suitable, known, commercially available cure site monomer.

The outer polymeric fusing layer can be coated to a thickness of from about 2 to about 80 microns, or from about 5 to about 60 microns, or from about 10 to about 40 microns.

Conductive fillers may be dispersed in the outer fusing layer of the fuser member. In the case of using a functional release agent, fillers are usually used in the outer fusing layers. In the case of using a non-functional release agent, fillers are normally not used in the outer fusing layer. If present, the fillers are capable of interacting with any functional groups of the release agent to form a thermally stable film which releases the thermoplastic resin toner and prevents the toner from contacting the filler surface material itself. This bonding enables a reduction in the amount of oil needed to promote release. Further, preferred fillers promote bonding with the oil, without causing problems of scumming or gelling. In addition, in an embodiment, the fillers are substantially non-reactive with the outer polymer material so that no adverse reaction occurs between the polymer material and the filler, which would hinder curing or otherwise negatively affect the strength properties of the outer surface material. Examples of suitable fillers are those listed above as useful in the optional intermediate layer.

Other additives such as adjuvants and fillers may be incorporated in the layers in accordance with the present invention provided that they do not affect the integrity of the polymer material. Such additives normally encountered in the compounding of elastomers include coloring agents, reinforcing fillers, and processing aids. Oxides such as magnesium oxide and hydroxides such as calcium hydroxide are suitable for use in curing many fluoropolymers.

Other layers such as adhesive layers or other suitable layers may be incorporated between the outer polymer layer and the intermediate silicone rubber layer, or between the substrate and the intermediate silicone rubber layer.

The polymer layers of the present invention can be coated on the fuser member substrate by any means including normal spraying, dipping and tumble spraying techniques. A flow coating apparatus as described in U.S. Pat. No. 6,408,753, the disclosure of which is hereby incorporated herein in its entirety, can also be used to flow coat a series of fuser rolls. In an embodiment, the polymers can be diluted with a solvent, and particularly an environmentally friendly solvent, prior to application to the fuser substrate. However, alternative methods can be used for coating layer including methods described in U.S. Pat. No. 6,099,673, the disclosure of which is hereby incorporated by reference in its entirety.

Polymeric fluid release agents are used in combination with the polymer outer layer to form a layer of fluid release agent which results in an interfacial barrier at the surface of the fuser member while leaving a non-reacted low surface energy release fluid as an outer release film. Suitable release agents include both functional and non-functional fluid release agents. Examples are functional and non-functional release agents including known polydialkysiloxane release agents, and in particular, polydimethylsiloxane release agents. The polydimethylsiloxane release agents can include functionality such as amino, mercapto, hydride, hydroxy, trifluoropropyl, nonylfluorohexyl, carbinol, and other functionality. Specific examples of suitable amino functional release agents include T-Type amino functional silicone release agents disclosed in U.S. Pat. No. 5,516,361; monoamino functional silicone release agents described in U.S. Pat. No. 5,531,813; and the amino functional siloxane release agents disclosed in U.S. Pat. No. 5,512,409, the disclosures each of which are incorporated herein in their entirety. Examples of mercapto functional release agents include those disclosed in U.S. Pat. No. 4,029,827; 4,029,827; and 5,395,725. Examples of hydride functional oils include U.S. Pat. No. 5,401,570. Other functional release agents include those described in U.S. Pat. No. 4,101,686; 4,146,659; and 4,185,140. Other release agents include those described in U.S. Pat. Nos. 4,515,884; and 5,493,376.

A nonionic surfactant is added to the release agent. The surfactant is added in an amount of from about 0.5 to about 10 percent, or from about 2 to about 5 percent by weight of total solids.

In embodiments, the nonionic surfactant is a fluorosurfactant. Fluorinated surfactants, like other surfactants, are amphipathic, meaning they contain two functional groups, each with different solubility or surface characteristics. More specifically, fluorosurfactants are a group of surfactants in which one group is fluorinated, and the other group can be hydrophobic, hydrophilic, lyophilic, lyophobic, or the like, depending on the system requirements. Addition of a fluorosurfactant to a release agent, for example a siloxane or polydimethylsiloxane release agent, can promote fluid wetting of the outer fuser member surface, such as a fluoroelastomers outer member surface. A surfactant that is reactive with the fluid functionality has the added benefit of robust and uniform incorporation of the fluid.

The release agent can comprise polydimethylsiloxane and a fluorosurfactant. In embodiments, the fluorosurfactant is other than a silicone glycol polymer, a perfluoroalkylsubstituted polyethylene glycol, or a perfluoroalkylsubstituted silane. In embodiments, the fluorosurfactant contains pendant groups selected from the group consisting of acid groups, ester groups, olefin groups, alcohol groups, silane groups, and the like, and mixtures thereof.

In embodiments, the fluorosurfactant used contains pendant acid or ester functionality. The acid or ester fluorosurfactants react well with release agents, such as polydimethylsiloxane release agents, such as, for example, those having amine functionality. The release agents form a robust solution with improved wettability on a fuser member surface, such as, for example, a fluoroelastomer surface. Examples of nonionic fluorosurfactants containing pendant acid or ester functionality include those having or encompassed by the following Formula I:

wherein n represents the number of repeating segments and can be, for example, a number of from about 1 to about 50, or from about 2 to about 12, or from about 5 to about 8, and wherein R can be a suitable group such as hydrogen, or an alkyl of for example, from about 1 to about 25 carbon atoms, or from about 1 to about 10 carbon atoms, or from about 1 to about 5 carbon atoms, and is for example, methyl, ethyl, propyl, butyl, pentyl, hexyl, heptyl, octyl, nonyl, decyl, and the like. Specific examples of suitable nonionic fluorosurfactants having pendant acid or ester functionality include perfluorotetradecanoic acid (for example, Aldrich product #446785), nonadecafluorodecanoic acid (for example, Aldrich product #17741), pentadecafluorooctanoic acid (for example, Aldrich product #171468, and 3M fluorochemicals FC-26), tridecafluoroheptanoic acid (for example, Aldrich product #342041), heptafluorobutyric acid (for example, 3M Fluorochemicals FC-23), methyl pentadecafluorooctanoate (for example, Aldrich Product #406457), and the like, and mixtures thereof.

In embodiments, the fluorosurfactant contains olefin pendant groups. Examples of fluorosurfactants containing olefin pendant groups include those having or encompassed by the following Formula II:

wherein n represents the number of repeating segments and can be, for example, a number of from about 1 to about 50, or from about 2 to about 20, or from about 5 to about 10. A specific example of a fluorosurfactant containing olefin pendant groups is 3,3,4,4,5,5,6,6,7,7,8,8,8-tridecafluoro-1-octene (for example, Aldrich product #370568).

In embodiments, the fluorosurfactant contains silane pendant groups. However, the fluorosurfactant is not a silicone glycol or perfluoroalkylsubstituted siland. Fluorosurfactants with hydrolyzable silicones can react with release agents, such as, for examnple, polydimethylsiloxane release agents. In embodiments, the release agent is a hydroxy functional silicone release agent. The release agent forms a robust solution with improved wettability on an outer fuser surface, such as, for example, a fluoroelastomer fuser member surface. Examples of fluorosurfactants containing silane pendant groups include those having or encompassed by the following Formula IV:

wherein n represents the number of repeating segments and can be, for example, a number of from about 1 to about 50, or from about 2 to about 10, or from about 3 to about 7; p is a number of from about 1 to about 50, or from about 2 to about 10; and $R_1$, $R_2$, and $R_3$ are the same or different and can be a suitable group such as, for example, a halide selected from the group consisting of chlorine, fluorine, bromine and iodine; a substituted or unsubsbtuted alkyl group having from about 1 to about 20 carbons, or from about 2 to about 10 carbons, or from about 3 to about 5 carbons, such as methyl, ethyl, propyl, butyl, pentyl, hexyl, heptyl, octyl, nonyl, decyl, and the like, wherein the substituents can be an alkyl group of from about 1 to about 20 carbons, or from about 2 to about 10 carbons, such as methyl, ethyl, propyl, butyl, pentyl, hexyl, heptyl, octyl, nonyl, decyl and the like, a halide group selected from the group consisting of chlorine, fluorine, bromine, and iodine; or an alkoxy group having from about 1 to about 20 carbons, or from about 2 to about 10 carbons, or from about 3 to about 5 carbons, such as methoxy, ethyoxy, propoxy, butoxy, pentoxy, hexoxy, heptoxy, octoxy, nonoxy, decoxy, and the like. Specific examples of fluorosurfactants having silane pendant groups include (heptadecafluoro-1,1,2,2-tetrahydrodecyl) dimethylchlorosilane (for example, Gelest product #SIH5840.4), (heptadecafluoro-1,1,2,2-tetrahydrodecyl) methyidichlorosilane (for example, Gelest product #SIH5840.6), (heptadecafluoro-1,1,2,2-tetrahydrodecyl) triethoxysilane (for example, Gelest product #SIH5841.2), (heptadecafluor-1,1,2,2-tetrahydrodecyl) trichlorosilane (for example, Gelest product #SIH5841.0), (tridecafluoro-1,1,2,2-tetrahydrooctyl) dimethylchlorosilane (for example, Gelest product SIT8170.0), (tridecafluoro-1,1,2,2-tetrahydrooctyl) methyidichlorosilane (for example, Gelest product SIT8172.0), (tridecafluoro-1,1,2,2,-tetrahydrooctyl) trichlorosilane (for example, Gelest product #SIT8174.0), (tridecafluoro-1,1,2,2,-tetrahydrooctyl) triethoxysilane (for example, Gelest product #SIT8175.0), (heptadecafluoro-1,1,2,2-tetrahydlrodecyl) triethoxysilane (for example, Gelest product SIH5841.2), (tridecafluoro-1,1,2,2-tetrahydrooctyl) triethoxysilane (for example, Gelest product SIT8175.0), (tris(tridecafluoro-1,1,2,2-tetrahydrooctyl) dimethylsiloxy) chlorosilane (for example, Gelest product # SIH8716.5), and the like, and mixtures thereof.

In embodiments, the fluorosurfactant comprises alcohol groups, except that the fluorosurfactant is other than a silicone glycol polymer or a perfluoroalkylsubstituted polyethylene glycol. The alcohol fluorosurfactants have polar functionality for silicone compatibility for the release agent, for example, a polydimethylsiloxane release agent, and a perfluorochain to improve fuser member outer coating wettability. In embodiments, the fluorosurfactant includes those having or encompassed by following Formula III:

$$CF_3—(CF_2)_n—R—OH$$

wherein n represents the number of repeating segments and can be, for example, a number of from about 1 to about 50, or from about 2 to about 10, or from about 3 to about 7, and R is a suitable group such as an alkyl having from about 1 to about 20 carbons, or from about 1 to about 10 carbons, or from about 1 to about 5 carbons, for example, methyl, ethyl, propyl, butyl, pentyl, hexyl, heptyl, octyl, nonyl, decyl, and the like. Specific examples of fluorosurfactants having pendant alcohol groups include 2,2,3,3,4,4,5,5,6,6,7,7,8,8,9,9,10,10,11,11,11-heneicosafluoro-1-undecanol (for example, Aldrich product #446858), 2,2,3,3,4,4,5,5,6,6,7,7,8,8,9,9,10,10,10,-nonadecafluoro-1-decanol (for example, Aldrich product #446831), 2,2,3,3,4,4,5,5,6,6,7,7,8,8-pentadecafluoro-1-octanol (for example, Aldrich product #257451), 3,3,4,4,5,5,6,6,7,7,8,8,8-tridecafluoro-1-octanol (for example, Aldrich product #370533), and the like, and mixtures thereof.

Another example of a fluorosurfactant having pendant functional groups is a fluorosurfactant having fluorocarbon chains such as FC-430 from 3M believed to have or be encompassed by the following Formula V:

The fluorosurfactant and polydimethyl siloxane release agents can be blended in advance of use, so that the product consists of a single blended fluid. Alternatively, blending can be carried out in-situ, whereby the fluorosurfactant is added to a conventional release agent in the printer or copier or other electrostatographic device. The later case will enhance the performance of the conventional fluid.

The addition of a fluorosurfactant to a release agent improves wettability of fluid to fuser surface by reducing surface tension, and decreases the occurrence of toner offset.

The method of reaction involves the fluorosurfactant bonding to the polydimethylsiloxane. The polydimethylsiloxane groups serve to protect the fuser member from toner offset, while the pendant fluorinated groups serve to promote rapid wetting of the fluid onto the fuser member surface. In embodiments wherein a functional polydimethylsiloxane release agent is used, the unreacted functionality that remains is available for reaction with the fuser member surface, thus providing a robust, rapid forming protective coating. A specific example of a reaction of a fluorosurfactant with a polydimethyl functional release agent is as follows. The following is a reaction of an amine functional siloxane fluid and a fluorosurfactant having pendant ester functionality. The fluorosurfactant pictured below is nonadecafluorodecanoic acid.

wherein n and m represent the number of repeating segments and can be, for example, numbers of from about 1 to about 50, or from about 2 to about 20, or from about 5 to about 10.

Another example of a release agent that will work well in conjunction with a reactive fluorosurfactant is a hydroxy-functional silicone fluid. The siloxy groups will condense with other siloxy groups that form from the hydrolysis of chlorosilanes or alkoxysilane surfactants. The following reaction is an example of a fluorosurfactant having pendant silane groups that will react with a hydroxy functional release agent. The fluorosurfactant pictured below is heptadecafluoro-1,1,2,2-tetrahydrodecyl) dimethyl chlorosilane and the reaction is as follows.

wherein n and m represent the number of repeating segments and can be, for example, numbers of from about 1 to about 50, or from about 2 to about 20, or from about 5 to about 10.

Again, in the final product, the polydimethylsiloxane groups serve to protect the fuser member from toner offset, while the pendant fluorinated groups serve to promote rapid wetting of the fluid onto the fuser member surface.

The fuser members are useful in combination with many toners, including black and white toner or color toner. However, the fuser members herein are particularly useful with color toners. Examples of suitable known color toners include those listed in U.S. Pat. No. 5,620,820; 5,719,002; and 5,723,245.

The fuser members disclosed herein are particularly useful in color duplication and printing, including digital, machines. The fuser members demonstrate excellent results at the higher temperatures, for example from about 150 to about 180° C., necessary in color fusing. The fuser members possess smooth, conformable layers having a relatively long-dwell nip and a decrease in swell. In addition, the normally required additional release agent is not necessary for improving toner release due to the increase in toner used for color developing with embodiments of the present fuser members. The fuser members herein provide complete toner flow, and increased gloss due to the configuration of the fuser members. Further, pinhole defects are decreased or eliminated and the surface energy is decreased by use of a surfactant.

The release layer material may or may not comprise conductive fillers. Suitable conductive fillers include carbon black; graphite; boron nitride; metal oxides such as copper oxide, zinc oxide, titanium dioxide, silicone dioxide, and the like; and mixtures thereof. If a filler is present in the release agent material, it is present in an amount of from about 0.5 to about 40 percent, or from about 0.5 to about 15 percent by weight of total solids.

The release agent is applied to the fuser member as a relatively thin outer coating layer prior to fusing of the developer material. The release agent can be applied to the fuser member by a wick, roller, or other known application member. The release agent is supplied in an amount of from about 0.1 to about 40 $\mu$l/copy, or from about 0.1 to about 15 $\mu$l/copy, and as a thin film covering the outer layer of the fuser member. The thin film of the release agent has a thickness of from about 2 microns to about 125 microns, or from about 8 to about 75 microns, or from about 12 to about 25 microns.

The viscosity of the fusing release agent is from about 50 to about 12,000 CpS, or from about 100 to about 1000, or from about 300 to about 800.

All the patents and applications referred to herein are hereby specifically and totally incorporated herein by reference in their entirety in the instant specification.

The following Examples further define and describe embodiments of the present invention. Unless otherwise indicated, all parts and percentages are by weight.

EXAMPLES

Example I

Preparation of Polydimethyl Siloxane Release Agent and Fluorosurfactant

A fluorosurfactant (FC-430 from 3M) was added at concentrations of 1.0% and 0.1% by weight of total solids to a non-functional polydimethyl siloxane fluid (350 Cs; Dow Corning 200 fluid) and mixed on a paint shaker for about 5 minutes. The solutions were observed for settling and miscibility and were found to be stable for several months, for example, about 8 months. A small drop of the 1% solution was placed on a fluoroelastomer (VITON® GF from Dupont) film next to a drop of the untreated silicone fluid. The two drops were compared visually and the modified silicone oil exhibited superior wettability (i.e., more extensive spreading) on the fluoroelastomer surface than the control sample. Other similar fluorinated surfactants from 3M that were tested include FC-171, FC-170C and TLF-8407. All wetted the fluoroelastomer surface better than a 350 cS polydimethylsiloxane nonfunctional fluid without the addition of a fluorosurfactant. In addition, all wetted equal to or better than a 350 cS, 0.09 mol % amino-functional silicone fluid.

While the invention has been described in detail with reference to specific and preferred embodiments, it will be appreciated that various modifications, including equivalents, substantial equivalents and similar equivalents thereof, and variations will be apparent to the artisan. All such modifications and embodiments as may readily occur to one skilled in the art are intended to be within the scope of the appended claims.

What is claimed is:

1. A release agent comprising a polydimethylsiloxane and a fluorosurfactant, wherein said fluorosurfactant comprises pendant functionality selected from the group consisting of acid functionality, ester functionality, olefin functionality, and hydroxy functionality, and wherein said fluorosurfactant is other than a silicone glycol polymer, a perfluoroalkylsubstituted polyethylene glycol, or a perfluoroalkylsubstituted silane, and wherein said fluorosurfactant is selected from the group consisting of 1) a fluorosurfactant having the following Formula I:

wherein n is a number of from about 1 to about 50, and wherein R is selected from the group consisting of hydrogen and an alkyl of from about 1 to about 25 carbon atoms, 2) a fluorosurfactant having the following Formula II:

wherein n is a number of from about 1 to about 50, and 3) a fluorosurfactant having the following Formula III:

wherein n is a number of from about 1 to about 50, and R is an alkyl having from about 1 to about 20 carbons.

2. A release agent in accordance with claim 1, wherein n in Formula I is from about 2 to about 12.

3. A release agent in accordance with claim 1, wherein R in Formula I is an alkyl having from about 1 to about 10 carbon atoms.

4. A release agent in accordance with claim 1, wherein said fluorosurfactant of Formula I is selected from the group consisting of perfluorotetradecanoic acid, nonadecafluorodecanoic acid, pentadecafluorooctanoic acid, tridecafluoroheptanoic acid, heptafluorobutyric acid, methyl pentadecafluorooctanoate, and mixtures thereof.

5. A release agent in accordance with claim 1, wherein n of Formula II is from about 2 to about 20.

6. A release agent in accordance with claim 1, wherein n of Formula II is from about 5 to about 10.

7. A release agent in accordance with claim 1, wherein said fluorosurfactant of Formula II is 3,3,4,4,5,5,6,6,7,7,8,8,8-tridecafluoro-1-octene.

8. A release agent in accordance with claim 1, wherein n of Formula III is a number of from about 2 to about 10 carbons.

9. A release agent in accordance with claim 1, wherein said fluorosurfactant of Formula III is selected from the group consisting of 2,2,3,3,4,4,5,5,6,6,7,7,8,8,9,9,10,10,11,11,11-heneicosafluoro-1-undecanol, 2,2,3,3,4,4,5,5,6,6,7,7,8,8,9,9,10,10,10,-nonadecafluoro-1-decanol, 2,2,3,3,4,4,5,5,6,6,7,7,8,8,8-pentadecafluoro-1-octanol, 3,3,4,4,5,5,6,6,7,7,8,8,8-tridecafluoro-1-octanol, and mixtures thereof.

10. A release agent in accordance with claim 1, wherein said fluorosurfactant is present in an amount of from about 0.5 to about 10 percent by weight of total solids.

11. A release agent in accordance with claim 10, wherein said fluorosurfactant is present in an amount of from about 2 to about 5 percent by weight total solids.

12. A release agent in accordance with claim 1, wherein said polydimethylsiloxane is non-functional.

13. A release agent in accordance with claim 1, wherein said polydimethylsiloxane is functional.

14. A release agent in accordance with claim 13, wherein said polydimethylsiloxane comprises functional groups selected from the group consisting of amine functional groups, hydride functional groups, mercapto functional groups, hydroxy functional groups, and mixtures thereof.

15. A release agent in accordance with claim 1, further comprising an electrically conductive filler selected from the group consisting of carbon fillers, metal fillers, metal oxide fillers, boron nitride, and mixtures thereof.

16. A release agent comprising a polydimethylsiloxane and a fluorosurfactant having pendant groups selected from the group consisting of acid groups, ester groups, olefin groups, hydroxy groups, and mixtures thereof, wherein said flutorosurfactant is other than a silicone glycol polymer, a perfluoroalkylsubstituted polyethylene glycol, or a perfluoroalkylsubstituted silane, and wherein said fluorosurfactant is selected from the group consisting of 1) a fluorosurfactant having the following Formula I:

$$CF_3-(CF_2)_n-C(=O)-O-R$$

wherein n is a number of from about 1 to about 50, and wherein R is selected from the group consisting of hydrogen and an alkyl of from about 1 to about 25 carbon atoms, 2) a fluorosurfactant having the following Formula II:

$$CF_3-(CF_2)_n-CH=CH_2$$

wherein n is a number of from about 1 to about 50, and 3) a fluorosurfactant having the following Formula III:

$$CF_3-(CF_2)_n-R-OH$$

wherein n is a number of from about 1 to about 50, and R is an alkyl having from about 1 to about 20 carbons.

17. An image forming apparatus for forming images on a recording medium comprising:

a charge-retentive surface to receive an electrostatic latent image thereon;

a development component to apply toner to said charge-retentive surface to develop said electrostatic latent image to form a developed image on said charge retentive surface;

a transfer component to transfer the developed image from said charge retentive surface to a copy substrate;

a fuser member for fusing toner images to a surface of said copy substrate; and a release agent comprising a polydimethylsiloxane and a fluorosurfactant comprises pendant functionality selected from the group consisting of acid functionality, ester functionality, olefin functionality, and hydroxy functionality, and wherein said fluorosurfactant is other than a silicone glycol polymer, a perfluoroalkylsubstituted polyethylene glycol, or a perfluoroalkylsubstituted silane, and wherein said fluorosurfactant is selected from the group consisting of 1) a fluorosurfactant having the following Formula I:

$$CF_3-(CF_2)_n-C(=O)-O-R$$

wherein n is a number of from about 1 to about 50, and wherein R is selected from the group consisting of hydrogen and an alkyl of from about 1 to about 25 carbon atoms, 2) a fluorosurfactant having the following Formula II:

$$CF_3-(CF_2)_n-CH=CH_2$$

wherein n is a number of from about 1 to about 50, and 3) a fluorosurfactant having the following Formula III:

$$CF_3-(CF_2)_n-R-OH$$

wherein n is a number of from about 1 to about 50, and R is an alkyl having from about 1 to about 20 carbons.

* * * * *